Figure 1:
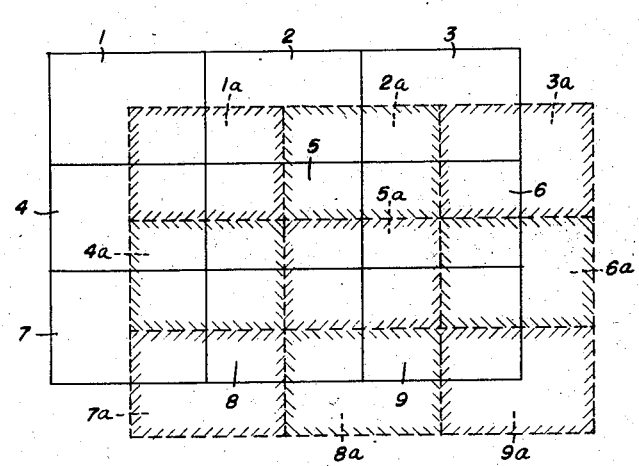

Aug. 12, 1958  O. HOFSHAGEN  2,846,782
ARRANGEMENT OF MAPS
Filed Aug. 13, 1956

INVENTOR
OLAV HOFSHAGEN

BY
ATTORNEYS

United States Patent Office 2,846,782
Patented Aug. 12, 1958

2,846,782

ARRANGEMENT OF MAPS

Olav Hofshagen, Trondheim, Norway

Application August 13, 1956, Serial No. 603,774

Claims priority, application Norway August 26, 1955

2 Claims. (Cl. 35—42)

The present invention is directed to improvements in maps, particularly maps for use in the field.

When using a conventional folded map in the field, it is quite difficult to plot the correct course when an area located in one of the corners of the map is to be passed. It is then necessary to place one or more of the adjoining maps next to each other, which is inconvenient and difficult to accomplish by virtue of the map margins. Furthermore, the maps often must be disposed upon an even supporting surface for proper use, and, such surfaces are not easily found in the field. In addition, the prior maps are not durable as they are soon damaged along the fold lines, and, are very sensitive to moisture.

Accordingly, the primary object of the present invention is to provide a map which will overcome the above and other objectionable characteristics present in the existing maps.

To accomplish the foregoing and other advantageous objects, the invention broadly comprises the use of a substantially stiff or rigid material as the map base in the form of sheets, with both the front and rear faces of the sheets having the map provided thereon and the map material on the rear face being offset with respect to the material on the front face so that an area or location on the front face situated in a corner thereof will appear in the central zone of the map material on the rear face.

By reason of this arrangement, the plotting of the course from such corner is greatly facilitated by merely turning the sheet, and, the rigidity of the map base does not require the employment of a supporting base or backing, and, the map can be easily stored within a map-case.

Another advantage of the invention is that the maps can be numbered on the rear face of each sheet, preferably along the upper marginal edge thereby allowing the entire front face to be used for the map material.

A further advantage of the present invention is that the sheets may be provided with perforations at each corner to enable the map sheets to be hung and joined together on a wall indoors to define a certain area which is of great importance for military purposes and, if the "front" is moving, additional sheets may be added.

Further objects and advantages of the invention will become more readily apparent to one skilled in the art from a study of the following description and the annexed claims, and, the invention consists in the details of construction and in the arrangement and combination of parts to be hereinafter more specifically set forth.

In describing the invention in detail, reference will be had to the accompanying drawing forming part of this application, wherein like numerals denote the same or similar parts in the several views and in which:

Fig. 1 diagrammatically illustrates several maps joined together to define a certain area.

Figure 2:
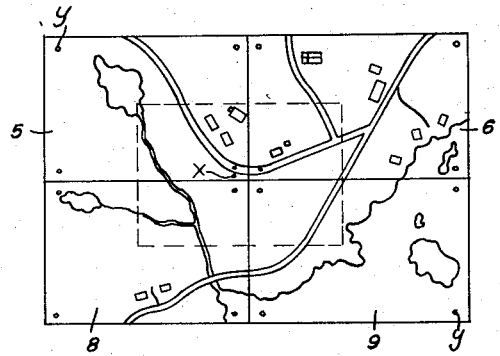
Figure 3:
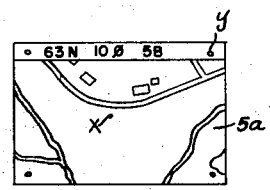

Fig. 2 is a detailed view consisting of four map sheets defining a certain area of Fig. 1, and, Fig. 3 is a view of the rear face of one of the sheets shown in Fig. 2.

Referring to Fig. 1, numerals 1 to 9 inclusive indicate the front faces of a plurality of individual sheets suitably joined together, and, the sheets are made of a stiff or rigid material, such as Celluloid, plastic, plastic coated cardboard and the like.

The rear faces of the same sheets are denoted $1a$ to $9a$, respectively, and, such rear faces are shown in Fig. 1 by the cross-hatched and dotted lines, with the map material of the rear faces being offset with respect to the material on the front faces. More specifically, and attention is called to Fig. 2 which illustrates a particular area composed of the four sheets indicated 5, 6, 8 and 9, an area "$x$" to be passed is located in the lower right hand corner of the front face of sheet 5 whereas that same area "$x$" appears in the central zone of the rear face $5a$ as can be seen in Fig. 3. Hence, if the area "$x$" on front face 5 is to be passed and the course is to be plotted through an area not appearing on sheet 5, but, on sheet 8, for example, the user may, in lieu of joining sheet 8 to sheet 5, chart the course more easily by merely reversing or turning sheet 5 and making use of rear face $5a$ wherein area "$x$" is situated in the central zone of such face. Manifestly, this saves considerable time and effort and under the conditions generally encountered in field work or exercises is a more satisfactory procedure than the customary practice.

It will also be noted in Fig. 3 that along the upper marginal edge of each rear face of the sheet, the pertinent numbering data for the sheet denoted $n$ appears. This numbering arrangement leaves the entire front face of the sheet free for the map material and as the central area of the rear face is the area generally of interest, the arrangement $n$ causes no problems.

As previously mentioned, it is possible to suspend the sheets on a wall and to achieve this end, an aperture $y$ is formed adjacent each corner of each of the sheets. This enables the sheets to be hung on nails or the like, and, additional sheets can be added to the assembly, if desired.

It will be appreciated that the salient feature of the invention resides in the fact that both faces of the map base are provided with mapping material and that area of the front face appearing in proximity to a certain corner of the front face will appear in the central part of the rear face of the sheet thereby permitting the course to be plotted by simply reversing the sheet.

The invention is not to be confined to any strict conformity with the showing in the drawing but may be changed or modified so long as such changes or modifications mark no material departure from the salient features of the invention as expressed in the appended claims.

Having thus described and illustrated the preferred embodiment of the invention, I hereby claim as novel, the following features.

I claim:

1. A map comprising a base of stiff sheet material, mapping material on each face of the base, and the material appearing adjacent one of the corners of the material on one face being located adjacent the central area of the other face.

2. A map as defined in claim 1 wherein the material appearing adjacent one of the corners is on the front face and the material located adjacent the central area being on the rear face.

References Cited in the file of this patent

UNITED STATES PATENTS

| 1,537,634 | Watson | May 12, 1925 |
| 1,587,506 | Charlton | June 8, 1926 |

FOREIGN PATENTS

| 81,693 | Norway | Apr. 27, 1953 |